United States Patent
Honma

(10) Patent No.: US 8,204,559 B2
(45) Date of Patent: Jun. 19, 2012

(54) FOLDABLE MOBILE DEVICE AND METHOD FOR MANUFACTURING CASE FOR THE SAME

(75) Inventor: Yasuyuki Honma, Kakegawa (JP)

(73) Assignee: NEC Corporation, Tokyo (JP)

( * ) Notice: Subject to any disclaimer, the term of this patent is extended or adjusted under 35 U.S.C. 154(b) by 1032 days.

(21) Appl. No.: 12/063,439

(22) PCT Filed: Aug. 23, 2006

(86) PCT No.: PCT/JP2006/316500
§ 371 (c)(1),
(2), (4) Date: Feb. 11, 2008

(87) PCT Pub. No.: WO2007/023854
PCT Pub. Date: Mar. 1, 2007

(65) Prior Publication Data
US 2009/0039546 A1    Feb. 12, 2009

(30) Foreign Application Priority Data
Aug. 24, 2005    (JP) .................................. 2005-242667

(51) Int. Cl.
*H04M 1/00* (2006.01)
(52) U.S. Cl. ............... 455/575.3; 455/550.1; 455/575.8; 455/575.1
(58) Field of Classification Search ............... 455/550.1, 455/575.8, 575.3, 575.1
See application file for complete search history.

(56) References Cited

U.S. PATENT DOCUMENTS

| | | | |
|---|---|---|---|
| 6,754,507 B2 * | 6/2004 | Takagi | 455/550.1 |
| 7,228,112 B2 * | 6/2007 | Ota et al. | 455/90.3 |
| 7,519,174 B2 * | 4/2009 | Tanaka et al. | 379/419 |
| 7,630,741 B2 * | 12/2009 | Siddiqui et al. | 455/575.1 |
| 7,676,242 B2 * | 3/2010 | Siddiqui et al. | 455/550.1 |
| 7,684,836 B2 * | 3/2010 | Taneda et al. | 455/575.3 |
| 7,885,653 B2 * | 2/2011 | Yamamoto et al. | 455/432.3 |
| 2002/0042252 A1 * | 4/2002 | Toyoda et al. | 455/90 |
| 2002/0072335 A1 * | 6/2002 | Watanabe | 455/90 |

FOREIGN PATENT DOCUMENTS

| | | |
|---|---|---|
| JP | 2908432 | 4/1999 |
| JP | 2000-151132 | 5/2000 |
| JP | 2002-064283 | 2/2002 |
| JP | 2003-031961 | 1/2003 |

(Continued)

OTHER PUBLICATIONS

Japanese Patent Office issued a Japanese Office Action dated Jul. 14, 2009, Application No. 2005-242667.

*Primary Examiner* — Kwasi Karikari
(74) *Attorney, Agent, or Firm* — Young & Thompson

(57) ABSTRACT

In the present invention, a rear cover 1 of a display part is made of at least a resin material, and a rear cover 4 of an operation part is made of a metal material. Respective plane portions of a front case 2 of the display part and a front case 3 of the operation part are made mainly of a metal material, and at least hinge parts 2c and 3c, which are formed on the front case 2 of the display part and the front case 3 of the operation part, are made of a resin material.

16 Claims, 6 Drawing Sheets

FOREIGN PATENT DOCUMENTS

| | | |
|---|---|---|
| JP | 2003-031962 | 1/2003 |
| JP | 2003-258446 A | 9/2003 |
| JP | 2004-7262 A | 1/2004 |
| JP | 2004-166191 | 6/2004 |
| JP | 2005-033320 | 2/2005 |
| JP | 2005-123735 | 5/2005 |
| JP | 2005-154864 | 6/2005 |
| JP | 2005-210419 A | 8/2005 |

\* cited by examiner

FOLDABLE MOBILE DEVICE AND METHOD FOR MANUFACTURING CASE FOR THE SAME

TECHNICAL FIELD

The present invention relates to a foldable mobile device in which a case of a display part and a case of an operation part are connected via a hinge part.

BACKGROUND ART

In the market for mobile devices of recent years typified by mobile phones and the like, foldable mobile devices in which the cases of a display part and the cases of an operation part are connected via hinge parts have become a main stream, and foldable mobile devices which are miniaturized and reduced in thickness are in high demand.

As a result, foldable mobile devices which are miniaturized and reduced in thickness are provided to the market one after another. However, when trying to reduce the thickness of the device, developing an excellent design and mechanical strength is always an issue.

For example, Japanese Patent Laid-Open No. 2005-154864 proposes applying plating treatment that has high uniformity to cases that are made of resin, which are used for low voltage product such as a mobile phone and a notebook type personal computer. In this art, the resin case is caused to adsorb a catalyst, a base metal is precipitated over the resin case in an electroless plating bath, the resin case is dipped into a plating bath obtained by adding an organic acid or organic acid salt such as acetic acid or nickel acetate to a nickel sulfamate bath or a nickel-cobalt sulfamate bath, and nickel is electrolytically precipitated so that the thickness of the plating film of nickel is about 5 µm to 30 µm, whereby rigidity and hardness of the resin plating can be enhanced by using nickel sulfamate for the plating bath.

DISCLOSURE OF THE INVENTION

However, the above described related art has the following problem.

When the entire case is configured by a resin material, it becomes difficult to secure sufficient mechanical strength, as the thickness of the foldable mobile device is reduced. When the entire case is made of metal, it is difficult to achieve unlimited design flexibility and difficult to form complicated shapes in the parts, which are to be fitted. Therefore, a thin foldable mobile device which is excellent in design and secures mechanical strength cannot be provided. The problem similarly applies to the art disclosed in the above described Japanese Patent Laid-Open No. 2005-154864.

Thus, an object of the present invention is to provide a foldable mobile device having an excellent design and reliable mechanical strength, and a method for manufacturing a case of the same.

In order to attain the above described object, a foldable mobile device of the present invention includes a case of a display part case including a front case of the display part and a rear cover of the display part, a case of an operation part including a front case of the operation part and a rear cover of the operation part, and a hinge part connecting the case of the display part and the case of the operation part. The rear cover of the display part is made of at least a resin material. The rear cover of the operation part is made of a metal material. The front case of the display part and the front case of the operation part are made of a composite material comprising a resin and a metal.

A method for manufacturing a case of a foldable mobile device according to the present invention is a method for manufacturing a case of a foldable mobile device including a case of a display part including a front case of the display part and a rear cover of the display part, a case of an operation part including a front case of the operation part and a rear cover of the operation part, and a hinge part connecting the case of the display part and the case of the operation part, and includes forming the rear cover of the display part of at least a resin material, forming the rear cover of the operation part of a metal material, and forming the front case of the display part and the front case of the operation part of a composite material comprising a resin and a metal.

According to the present invention, a foldable mobile device having an excellent design and reliable mechanical strength can be provided.

BEST MODE FOR CARRYING OUT THE INVENTION

Figure 1:
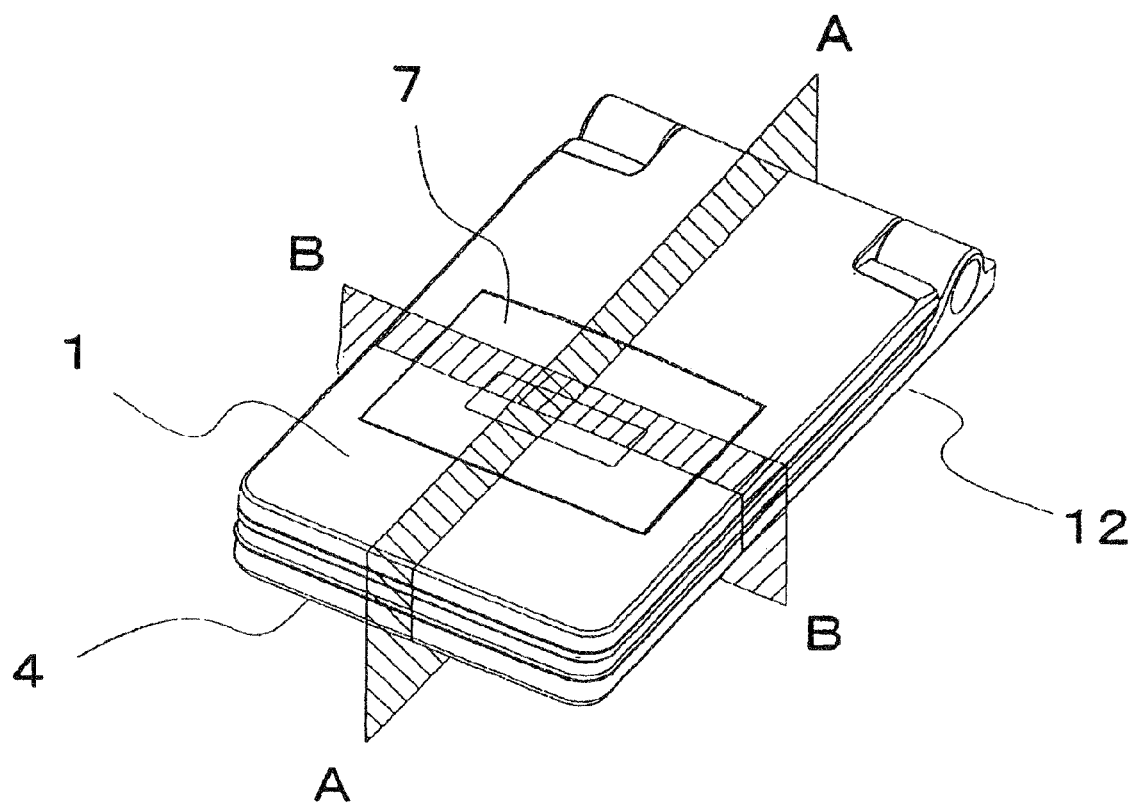
FIG. 1 is a perspective view showing a closed state in a foldable mobile phone of an exemplary embodiment.

Hereinafter, an exemplary embodiment of the present invention will be described in detail with reference to the drawings. In this embodiment, the present invention is applied to a foldable mobile phone as an example of foldable mobile devices, and for example, information processing devices such as a PDA (Personal Data Assistant) and a notebook type personal computer are naturally included as examples of foldable mobile devices. Common parts in the respective drawings are assigned with the same reference numerals and characters.

Figure 2:
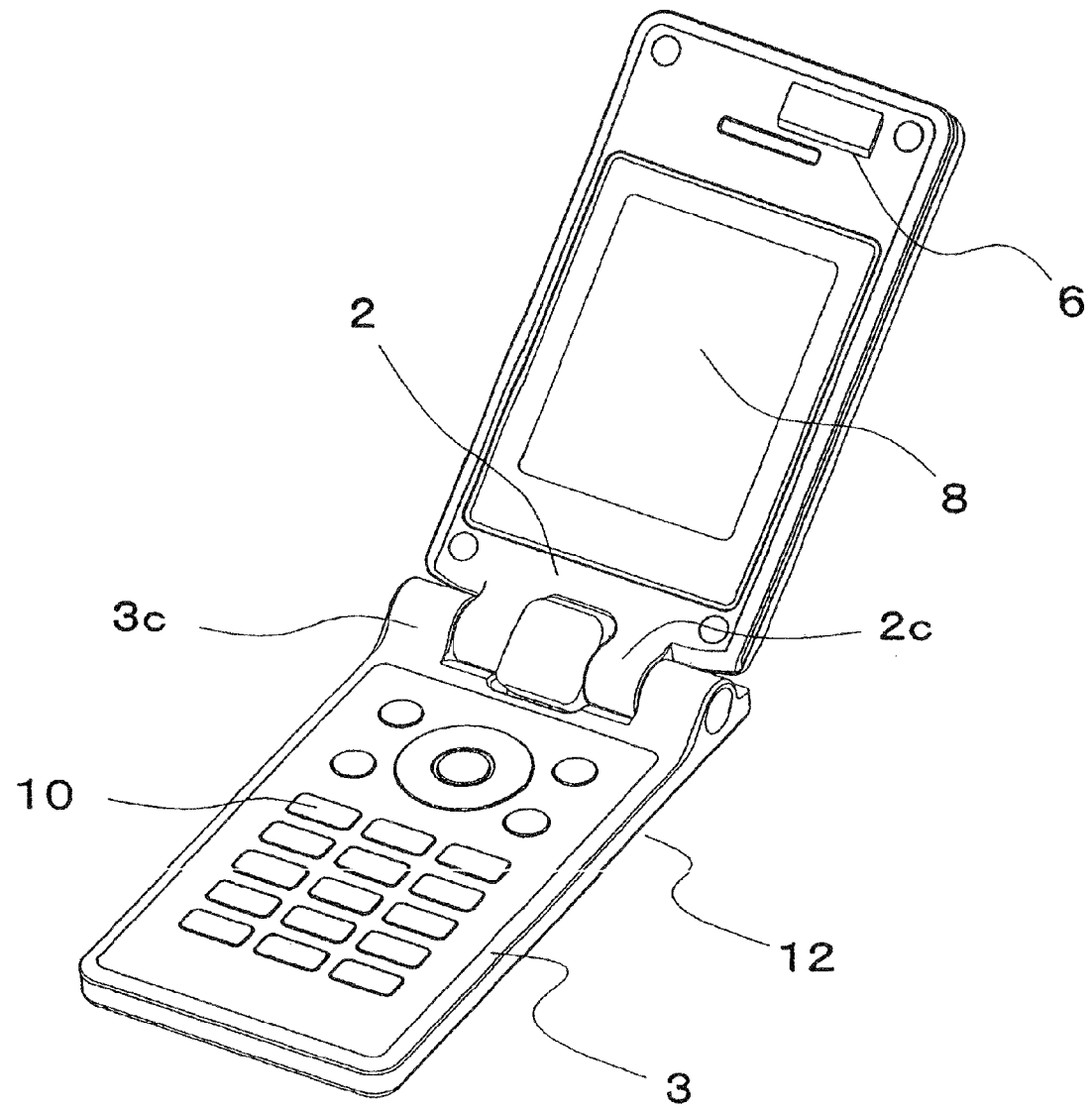
FIG. 2 is a perspective view showing an opened state in the foldable mobile phone of the exemplary embodiment.

FIG. 1 is a perspective view showing a closed state in foldable mobile phone 12 of this exemplary embodiment. FIG. 2 is a perspective view showing an opened state in foldable mobile phone 12 of this exemplary embodiment.

As shown in FIGS. 1 and 2, foldable mobile phone 12 is configured by including, for the case of a display part, rear cover 1 of a display part especially including many design elements and including sub display part 7, and front case 2 of the display part including main display part 8 and hinge part 2c, and for the case of an operation part, rear cover 4 of the operation part including especially fewer design elements, and front case 3 of the operation part including key operation part 10 and hinge part 3c, as main components.

Figure 3:
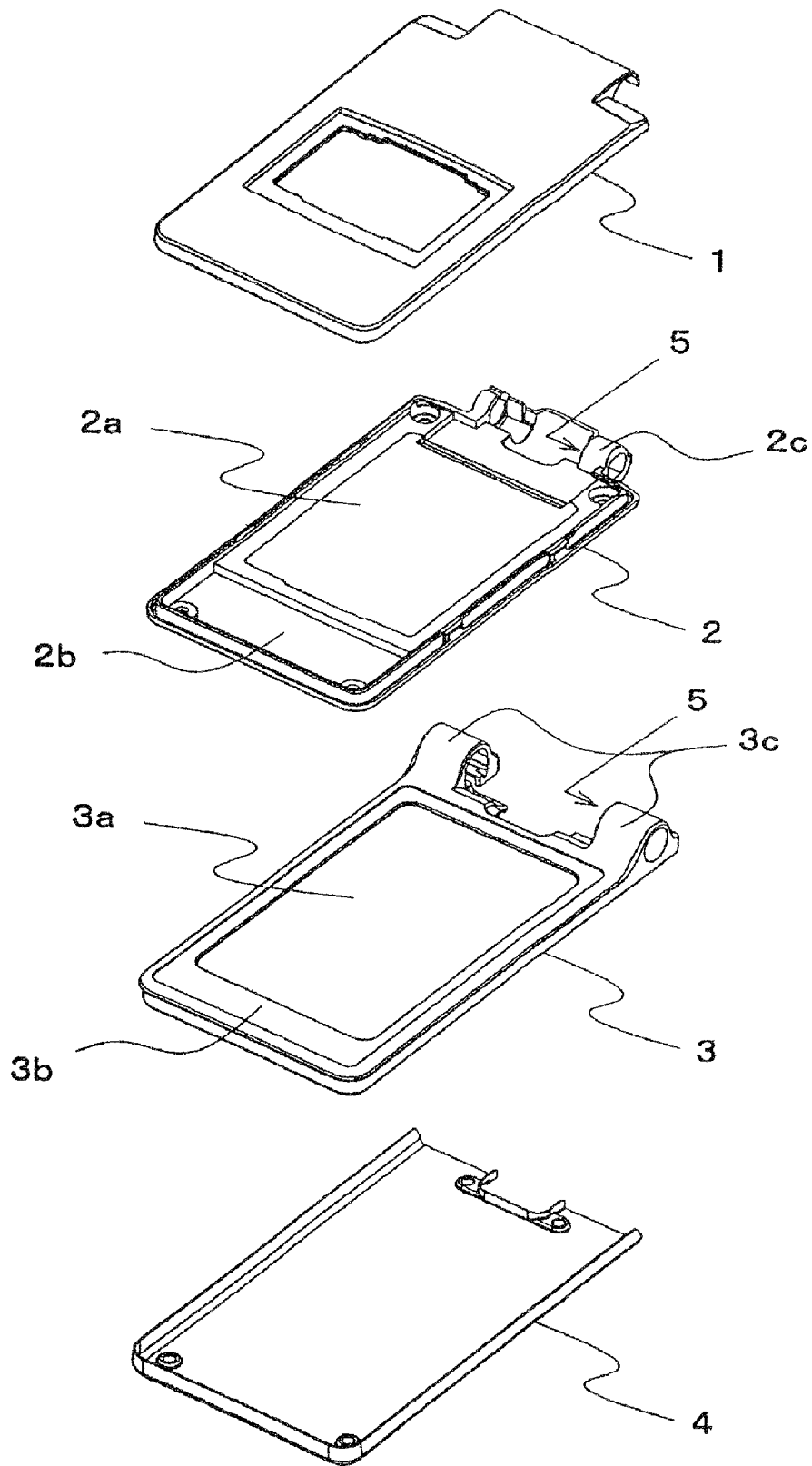
FIG. 3 is an exploded perspective view showing a main component in the foldable mobile phone of the exemplary embodiment.
Figure 4:
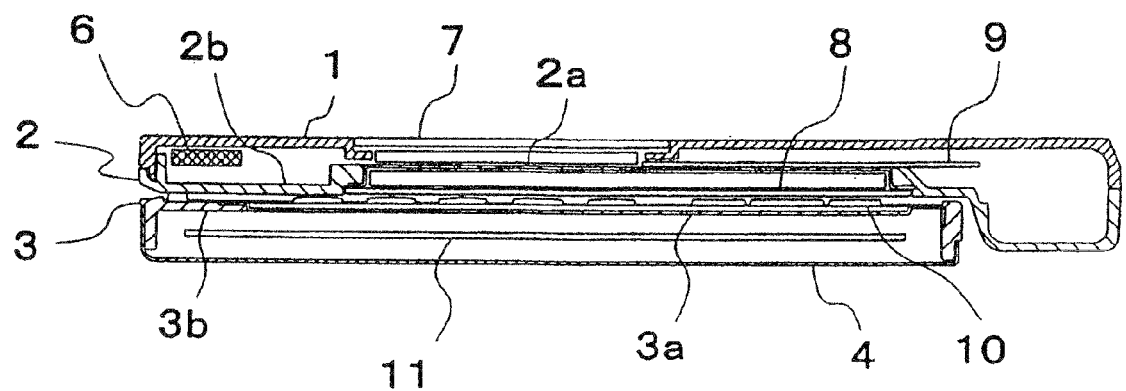
FIG. 4 is a sectional view taken along line A-A in FIG. 1 in the exemplary embodiment.

FIG. 3 is an exploded perspective view of the main components. FIG. 4 is a sectional view taken along line A-A in FIG. 1, and FIG. 5 is a sectional view taken along line B-B in FIG. 1.

Figure 5:
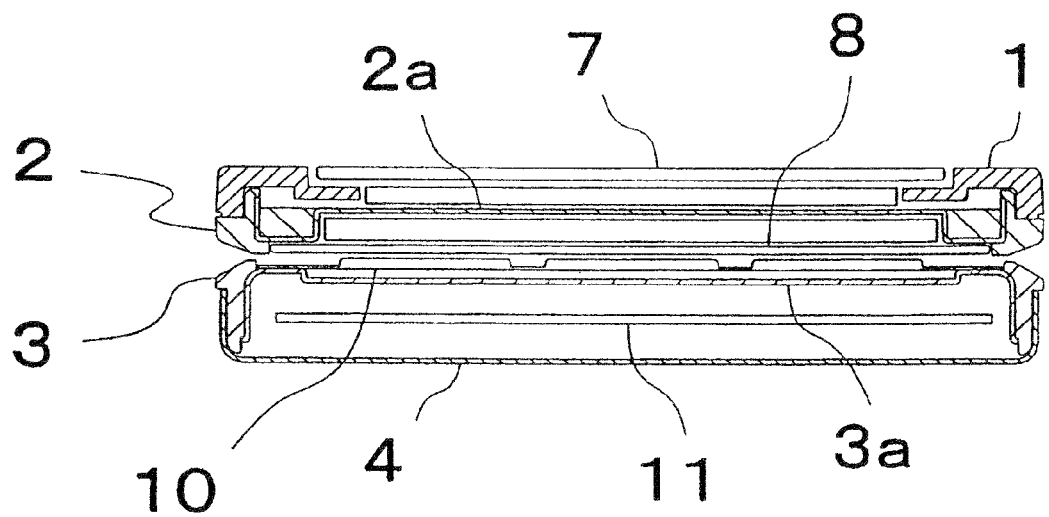
FIG. 5 is a sectional view taken along line B-B in FIG. 1 in the exemplary embodiment.

As shown in FIGS. 3 to 5, front case 2 of the display part and front case 3 of the operation part are configured by sheet metal parts 2a and 3a for the purpose of reducing thickness and obtaining reliable mechanical strength, and by resin parts 2b and 3b for the purpose of forming parts that have complicated shape and that are to be fitted, hinge parts 2c and 3c and the like to be fitted to rear cover 1 of the display part and rear cover 4 of the operation part. Front case 2 of the display part and front case 3 of the operation part are connected via hinge 5.

Printed board 9 mounted with electric components is provided in the display part's case comprising rear cover 1 of the display part and front case 2 of the display part. Printed board 11 mounted with electric components is provided in the case of the operation part comprising front case 3 of the operation part and rear cover 4 of the operation part.

In addition to printed board 9, antenna 6 is also provided in the case of the display part comprising rear cover 1 of the display part and front case 2 of the display part.

Next, the material composition of the case of foldable mobile phone 12 of the exemplary embodiment will be described in detail.

As shown in FIG. 3, the case of the display part of foldable mobile phone 12 is comprised of rear cover 1 of the display part and front case 2 of the display part.

Rear cover 1 of the display part is located facing the outside of the device, that is an exterior, when foldable mobile phone 12 is opened and closed, and therefore, is a component in which excellence in design is especially important and various outer design shapes are required. Therefore, a resin material from which various shapes are easily molded is used for the material of rear cover 1 of the display part.

Front case 2 of the display part is a component that is required to have such mechanical strength that main display part 8 will not break, because main display part 8, which occupies most of the area of front case 2 of the display part, is disposed in it as shown in FIG. 2. Front case 2 of the display part is also a component which requires that fitting portions that have complicated shapes be fitted to rear cover 1 of the display part, a hinge portion mounted with hinge 5 and the like are required.

Therefore, in front case 2 of the display part, a metal material that has both sufficient mechanical strength and thickness is used as the material of sheet metal part 2a holding main display part 8. Meanwhile, in front case 2 of the display part, a resin material which allows complicated shapes to be easily molded and size adjustment to be easily made, is used as the material of resin part 2b that forms a fitting part and hinge part 2c to which the hinge is mounted. Specifically, a composite material formed of combination of a metal material and a resin material used as the material of front case 2 of the display part.

The case of the operation part of foldable mobile phone 12 is comprised of front case 3 of the operation part and rear cover 4 of the operation part.

Rear cover 4 of the operation part is located facing the outside of the device, that is an exterior, when foldable mobile phone 12 is opened and closed, but is located on a back surface of foldable mobile phone 12, and therefore, rear cover 4 of the operation part is a component in which excellence in design is relatively unimportant. Therefore, it is not necessary that a plate sheet component have a complicated shape, and priority is given to using materials for rear cover 4 of the operation part that has reliable mechanical strength and sufficient thickness.

Front case 3 of the operation part is a component that whose mechanical strength is such that foldable mobile phone 12 is not broken when there is a need to press the operation keys—this is because key operation part 10, that occupies most of front case 3 of the operation part, is disposed in it as shown in FIG. 2. Front case 3 of the operation part is also a component which requires that complicated shapes be fitted to rear cover 4 of the operation part, a hinge part to which hinge 5 is mounted and the like be mounted on the front case 3.

Therefore, in front case 3 of the operation part, a metal material has both sufficient mechanical strength and thinness is used as the material for sheet metal part 3a holding key operation part 10. Meanwhile, in front case 3 of the operation part, a resin material, which allows complicated shapes to be easily molded and size adjustment to be easily made, is used as the material of resin part 3b that forms a fitting part and hinge part 3c to which the hinge is mounted. Specifically, a composite material formed of combination of a metal material and a resin material is used as the material of front case 3 of the operation part.

Next, based on the material composition of the case of foldable mobile phone 12 of the exemplary embodiment, a device configuration of foldable mobile phone 12 will be described in more detail.

As shown in FIG. 1, as one of the design elements, sub display part 7 is placed on rear cover 1 of the display part, in which many design elements are required.

As shown in FIG. 2, the hinge part is configured by hinge part 2c of front case 2 of the display part made of a resin material, on which main display part 8 occupying most part of front case 2 of the display part is placed, and hinge part 3c of front case 3 of the operation part made of a resin material, in which key operation part 10 occupying most of front case 3 of the operation part is placed.

As shown in FIGS. 4 and 5, the thickness of sheet metal part 2a of front case 2 of the display part, sheet metal part 3a of front case 3 of the operation part and rear cover 4 of the operation part, which are made of a metal material, is reduced small, and thereby, the thickness of foldable mobile phone 12 can be reduced. Further, due to the structure surrounded by the metal material of sheet metal part 2a of front case 2 of the display part, sheet metal part 3a of front case 3 of the operation part and rear cover 4 of the operation part, sufficient mechanical strength of foldable mobile phone 12 can be secured, and board 9 disposed inside the case of the display part, and board 11 disposed inside the case of the operation part are protected.

As shown in FIGS. 2 and 4, antenna 6 is placed at a position covered with a resin material that is used in rear cover 1 of the display part and resin part 2b of front case 2 of the display part, and sheet plate part 2a of front case 2 of the display part, which interferes with the characteristics of the antenna, is configured to be disposed at a certain distance from the antenna 6.

According to the exemplary embodiment, the respective plane portions of front case 2 of the display part and front case 3 of the operation part are made mainly of a metal material, and rear cover 4 of the operation part is made only of a metal material, whereby reduction in thickness, which cannot be achieved with a resin material, can be realized. Further, according to the exemplary embodiment, rear cover 1 of the display part is made of a resin material that is the same as that of the conventional foldable mobile phone, and thereby, the same degree of freedom of design can be obtained. Further, according to the exemplary embodiment, because, in particular, parts such as the fitting part and the hinge part of the case, have complicated shapes and which is not related to the thickness of the device in front case 2 of the display part and front case 3 of the operation part are made of a resin material, assemblability and disassemblability of the case can be kept the same level of those of the conventional foldable mobile phone. Further, according to the exemplary embodiment, the main three components that are front case 2 of the display part, front case 3 of the operation part and rear cover 4 of the operation part are configured mainly by a metal material, and thereby, foldable mobile phone 12 having sufficient mechanical strength can be provided.

Further, according to foldable mobile phone 12, the antenna part is disposed in the portion that is comprised of rear cover 1 of the display part that is made only of a resin material and of resin part 2*b* of front case 2 of the display part that is made of a resin material, whereby even when the antenna part is mounted in the device of the foldable mobile phone, the antenna is not shielded with the metal material, and degradation of the antenna characteristics can be avoided.

Further, in foldable mobile phone 12, rear cover 1 of the display part is made only of the resin material, and rear cover 4 of the operation part is comprised of only the metal material, whereby a weight difference occurs between rear cover 1 of the display part and rear cover 4 of the operation part. Therefore, in foldable mobile phone 12, in which the case of the operation part is handled for opening and closing and the case of the operation part is usually held by hand, the opening and closing operations are facilitated by the weight of the case of the display part being made relatively light. The holdability of foldable mobile phone 12 can be enhanced by making the weight of the case of the operation part relatively heavy. Further, when foldable mobile phone 12 is in the opened state, the center of gravity is located in the case of the operation part. Therefore, when foldable mobile phone 12 is placed on a desk or the like, the display part side will not fall down, and the state of the phone can be kept stable due to the case of the operation part and the desk being in close contact with each other.

Next, an exemplary embodiment of the present invention will be described. In the exemplary embodiment, a foldable mobile phone is also used as one example of a foldable mobile device, and the basic configuration is the same as that in the above described exemplary embodiment. Therefore, redundant explanation will be omitted.

This exemplary embodiment differs from the above described exemplary embodiment in the points that rear cover 1 of the display part of foldable mobile phone 12 is configured by only a metal material, and that rear cover 1 of the display part is configured by a composite material in which a resin material and a metal material are combined.

First, when rear cover 1 of the display part is made only of a metal material, there is the disadvantage that this limits the shape of the design, and the disadvantage that an antenna mounted inside a case made of a metal will cause the antenna's characteristic to degrade, as compared with the case in which rear cover 1 of the display part is made of a resin material. Therefore, in many cases, the mounting position of the antenna needs to be located outside of the metal case instead of inside of the case in order to that the characteristics of the antenna will no be influenced. However, when rear cover 1 of the display part is made only of a metal material, the thickness of foldable mobile phone 12 can be further reduced, and the mechanical strength can be further improved.

Next, when rear cover 1 of the display part is configured by a composite material of a resin material and a metal material, processing of fine design shapes cannot be applied to the metal material occupying most part of the design part, but the antenna can be mounted inside the case, and therefore, foldable mobile phone 12 can be configured to be thin.

Figure 6:
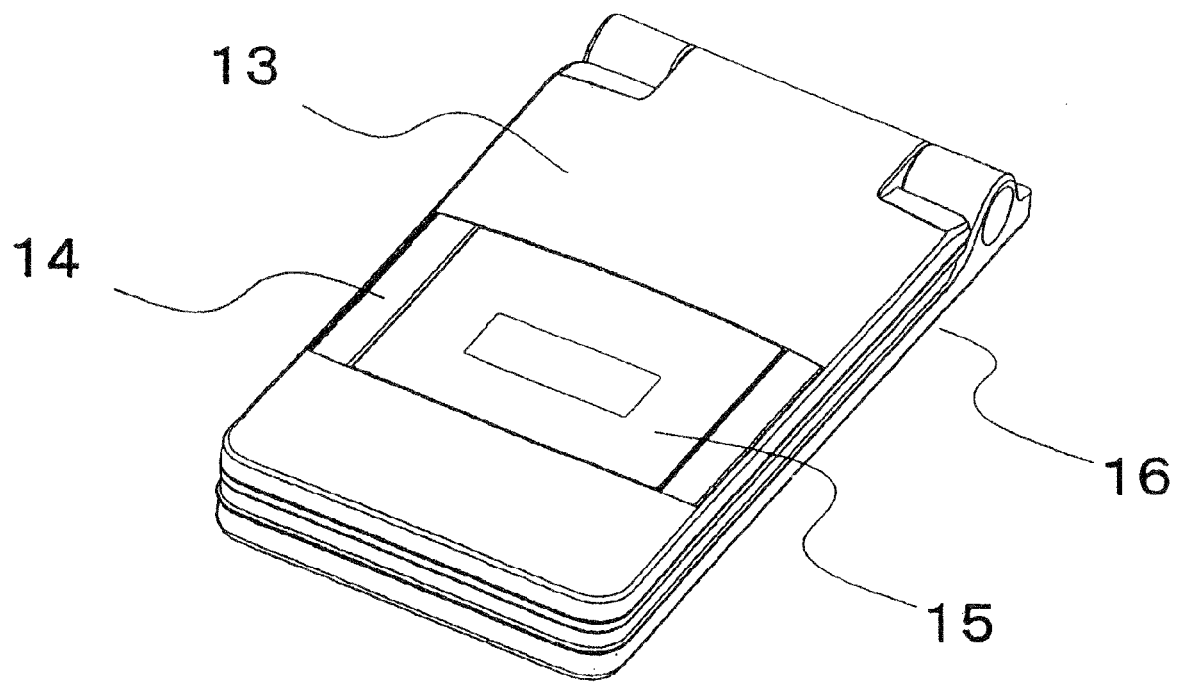
FIG. 6 is a perspective view showing a closed state in a foldable mobile phone of an exemplary embodiment.
Figure 7:
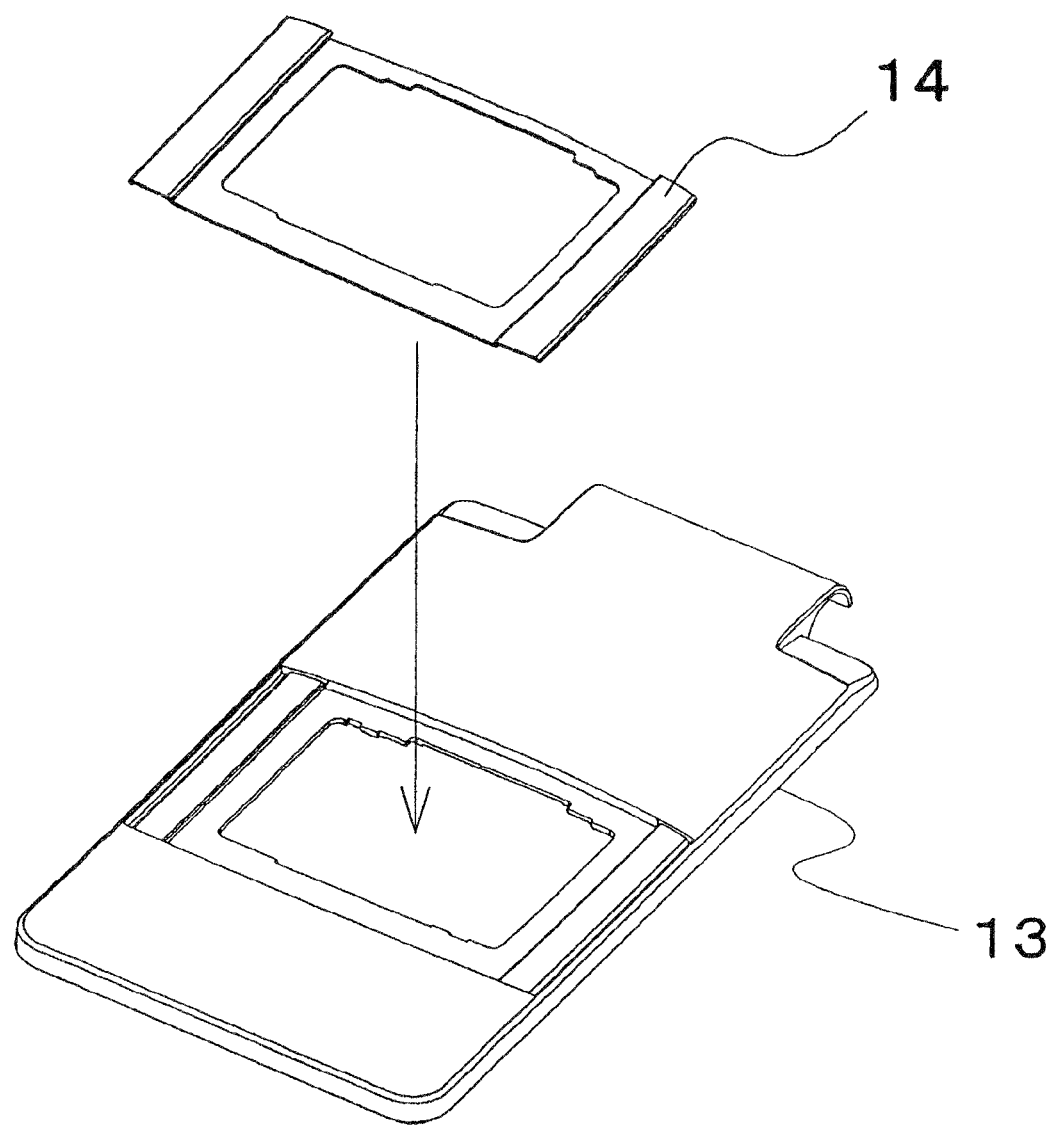
FIG. 7 is a perspective view showing a constitution of a rear cover of a display part in the exemplary embodiment.

One example of the configuration of foldable mobile phone 12 of the exemplary embodiment is shown in FIG. 6. Plate 14 that is made of a metal material and that is used as a decorative design part is fixed to a perimeter portion of sub display part 15 in rear cover 13 of the display part that is constructed only of a resin material, and a result, a synergistic effect which combines excellence design and good mechanical strength can be realized while maintaining a balance between thinness and weight in the foldable mobile phone 12. Case 16 of the operation part is similarly made of combination of front case 3 of the operation part and rear cover 4 of the operation part described in the previous exemplary embodiment. Plate 14 that is made of the metal material is a decorative design part that may be fitted into rear cover 13 of the display part that is made only of a resin material as shown in FIG. 7.

The above described respective embodiments are exemplary embodiments of the present invention, and various modifications can be made within the scope without departing from the spirit of the present invention. For example, the present invention includes a method for manufacturing a foldable mobile device by forming rear cover 1 of the display part, front case 2 of the display part, front case 3 of the operation part, rear cover 4 of the operation part and the like from the respective materials in the above described respective embodiments.

The invention claimed is:

1. A foldable mobile device, comprising:
   a case of a display part including a front case of said display part and a rear cover of said display part;
   a case of an operation part including a front case of said operation part and a rear cover of said operation part; and
   a hinge part connecting said case of said display part and said case of said operation part,
   wherein said rear cover of said display part is made of at least a resin material,
   said rear cover of said operation part is made of a metal material,
   said front case of said display part formed of a resin and a metal material, a planar portion of said front case of said display part formed of only said metal material and surrounded on a periphery of said planar portion by said resin, and
   said front case of said operation part formed of said resin and said metal material, a planar portion of said front case of said operation part formed of only said metal material and surrounded on a periphery of said planar portion by said resin.

2. A foldable mobile device, comprising:
   a case of a display part including a front case of said display part and a rear cover of said display part;
   a case of an operation part including a front case of said operation part and a rear cover of said operation part; and
   hinge parts connecting said case of said display part and said case of said operation part,
   wherein said rear cover of said display part is made of at least a resin material,
   said rear cover of said operation part that is only made of a metal material, and
   respective plane portions of said front case of said display part and said front case of said operation part are made of only a metal material, and a periphery of said respective plane portions including at least said hinge parts formed on said front case of said display part and said front case of said operation part of a resin material.

3. The foldable mobile device according to claim 1, wherein said rear cover of said display part is made of a composite material comprising a resin and a metal.

4. The foldable mobile device according to claim 1,
wherein an antenna part is disposed at portions that are made of a resin material that is used in said rear cover of said display part and said front case of said display part.

5. The foldable mobile device according to claim 1,
wherein said case of said display part is made relatively lighter in weight than said case of said operation part.

6. The foldable mobile device according to claim 2,
wherein said rear cover of said display part is made of a composite material comprising a resin and a metal.

7. The foldable mobile device according to claim 2,
wherein an antenna part is disposed at portions that are made of a resin material that is used in said rear cover of said display part and said front case of said display part.

8. The foldable mobile device according to claim 2,
wherein said case of said display part is made relatively lighter in weight than said case of said operation part.

9. A method for manufacturing a case of a foldable mobile device comprising a case of a display part including a front case of said display part and a display part's rear cover, a case of an operation part including a front case of an operation part and a rear cover of an operation part, and a hinge part connecting said case of said display part and said case of said operation part, comprising:
   forming said rear cover of said display part of at least a resin material;
   forming said rear cover of said operation part of a metal material;
   forming said front case of said display part of a resin and a metal material, a planar portion of said front case of said display part formed of only said metal material and surrounded on a periphery of said planar portion by said resin, and
   forming said front case of said operation part of said resin and said metal material, a planar portion of said front case of said operation part formed of only said metal material and surrounded on a periphery of said planar portion by said resin.

10. A method for manufacturing a case of a foldable mobile device comprising a case of a display part including a front case of said display part and a rear cover of said display part, a case of an operation part including a front case of said operation part and a rear cover of said operation part, and hinge parts connecting said case of said display part and said case of said operation part, comprising:
   forming said rear cover of said display part of at least a resin material;
   forming said rear cover of said operation part such that it is only made of a metal material; and
   forming respective plane portions of said front case of said display part and said front case of said operation part of only a metal material, and
   forming a periphery of said respective plane portions including said hinge parts on said front case of said display part and said front case of said operation part of a resin material.

11. The method for manufacturing a case of a foldable mobile device according to claim 9,
wherein said rear cover of said display part is made of a composite material comprising of a resin and a metal.

12. The method for manufacturing a case of a foldable mobile device according to claim 9, further comprising:
   disposing an antenna part at portions made of a resin material used in said rear cover of said display part and in said front case of said display part.

13. The method for manufacturing a case of a foldable mobile device according to claim 9,
wherein said case of said display part is formed to be relatively lighter in weight than said case of said operation part.

14. The method for manufacturing a case of a foldable mobile device according to claim 10,
wherein said rear cover of said display part is made of a composite material comprising of a resin and a metal.

15. The method for manufacturing a case of a foldable mobile device according to claim 10, further comprising:
   disposing an antenna part at portions made of a resin material used in said rear cover of said display part and in said front case of said display part.

16. The method for manufacturing a case of a foldable mobile device according to claim 10,
wherein said case of said display part is formed to be relatively lighter in weight than said case of said operation part.

* * * * *